Patented Jan. 17, 1933

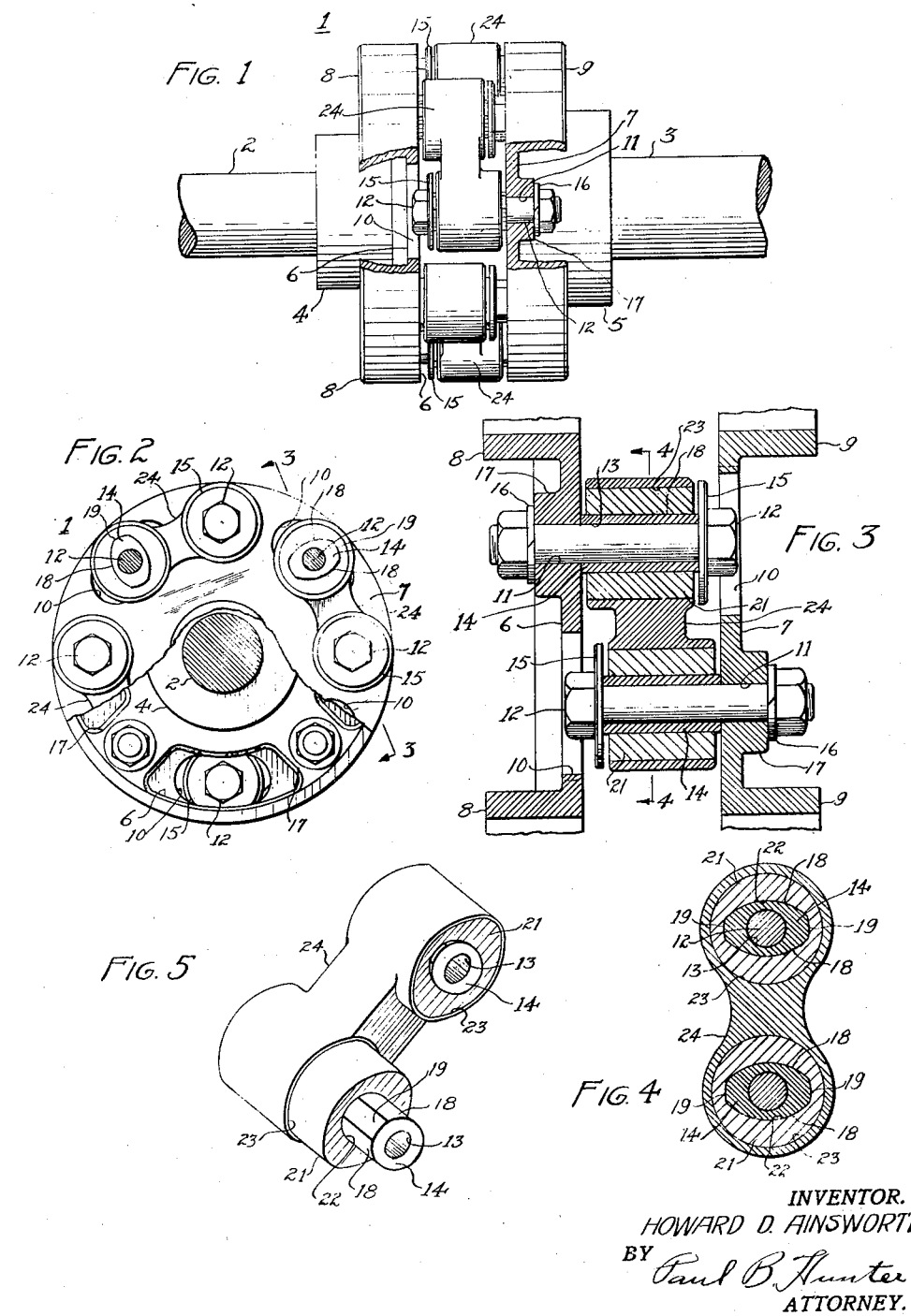

1,894,507

UNITED STATES PATENT OFFICE

HOWARD D. AINSWORTH, OF BERKELEY, CALIFORNIA, ASSIGNOR TO F. A. B. MANUFACTURING COMPANY, OF OAKLAND, CALIFORNIA, A CORPORATION OF NEVADA

FLEXIBLE COUPLING

Application filed May 17, 1930. Serial No. 453,118.

This invention relates, generally, to couplings and the invention has reference more particularly to a novel flexible shaft coupling adapted to flexibly connect adjacent shafts for the transmission of power and motion from one to the other; the said novel flexible coupling employing bushings of a suitable cushioning material, preferably rubber, for absorbing shocks and jars occurring in use and caused, for example, by torque variations or by shaft misalignment or end play.

Flexible couplings employing bushings of cushioning material such as rubber as heretofore generally constructed have been somewhat unsatisfactory in use owing to the limited torque or power transmitting capacities of the couplings and to the rapid deterioration of the cushioning material in use. Such couplings commonly employ cylindrical power transmitting pins or yokes working in hollow cylindrical bushings of cushioning material such as rubber. In practice, the power transmitting pins quickly wedge or cut themselves into the bushings of cushioning material along the line of torque stress, thereby breaking down the rubber and causing the rapid deterioration and consequent rupture of the bushings. In order that such couplings shall have a reasonable length of life it is necessary to limit the torque transmitted to a relatively small value. Also, it has been found that shaft misalignment and especially end play cause relative motion between the rubber or other bushings and the power transmitting pins, resulting in excessive friction and consequent rapid deterioration of the rubber bushings.

Attempts have been made to eliminate such frictional wear of bushings by vulcanizing or otherwise rigidly securing the working surfaces of the rubber bushings to metallic thimbles which in turn slide on the power transmitting pins, but such structures are unsatisfactory in use as they require frequent lubrication. Also, at times the rubber bushings have been vulcanized directly to the power transmitting pins but this makes replacement of worn bushings difficult or impossible while the objectionable cutting and consequent deterioration of the bushings by the enclosed cylindrical pins is still present.

Applicant's former Patent No. 1,752,138 discloses a flexible coupling which largely overcomes the objections above noted by employing power transmitting pins having irregular surface contours with flattened surface portions extending at right angles to the line of torque stress. These flattened surfaces distribute the stress uniformly over uniform thicknesses of the rubber bushings, thereby causing the bushings to have a long life in use. The novel coupling of the present invention while of the general type disclosed in my before mentioned patent, embodies certain modifications and improvements not present in the coupling of said patent.

The principal object of the present invention is to provide a novel flexible coupling which, though designed to substantially uniformly distribute the transmitted torque over uniform thicknesses of the rubber or other bushing of cushioning material used, is also provided with means for limiting the deflection or flow of the bushing material while under load, whereby injury or rupture of the bushing is prevented, while at the same time providing ample relative movement of the coupling yokes or flanges to absorb all shocks and jars.

Another object of the present invention lies in the provision of a flexible coupling having bushings of cushioning material which fit snugly against but are not vulcanized or otherwise positively secured to the adjoining coupling parts, so that ready removal or replacement of the bushings is possible when desired, and which bushings by the flexing thereof provide for all relative movements of the coupling yokes or flanges without any motion taking place between the surfaces of the bushings and the adjoining coupling parts.

Still another object of the present invention is to provide a novel flexible coupling of exceedingly simple construction and of few parts, which parts are readily removable and replaceable, the said coupling having an extremely long life in actual practice and being capable of transmitting relatively enormous loads for long periods of time while at the same time electrically insulating one coupling yoke from the other.

Other objects of this invention, not at this time more particularly enumerated, will be clearly understood from the following detailed description of the same.

The invention is clearly illustrated in the accompanying drawing, in which:—

Fig. 1 is a view in elevation of the novel flexible coupling of this invention connecting two shafts, portions of the coupling being broken away;

Fig. 2 is a view with parts broken away looking at the left end of the structure shown in Fig. 1;

Fig. 3 is an enlarged sectional view taken along line 3—3 of Fig. 2; and looking in the direction of the arrows;

Fig. 4 is a sectional view taken along line 4—4 of Fig. 3, looking in the direction of the arrows; and Fig. 5 is a perspective view of a coupling link and shows a rubber bushing and pin block partially inserted into an eye of the link.

Similar characters of reference are employed in all of the hereinabove described views, to indicate corresponding parts.

Referring now to the said drawing, the reference numeral 1 designates the novel flexible coupling of this invention as a whole, which is illustrated as connecting shafts 2 and 3 in power transmitting relation. Coupling 1 comprises shaft yokes 4 and 5 having their hubs keyed or otherwise secured to the shafts 2 and 3 respectively. Opposite, radially extending flanges 6 and 7 are formed on the hubs of shaft yokes 4 and 5 and are positioned in spaced relation with respect to one another. Radial flanges 6 and 7 are provided at their peripheries with circumferentially extending flanges 8 and 9 which partially overlie the respective hubs of the shaft yokes 4 and 5.

Radial flanges 6 and 7 are provided with a plurality of circumferentially arranged pin or bolt apertures 11. Apertures 11 are shown spaced equally from one another and are illustrated as four in number in each flange although it is to be understood that a greater or even lesser number of these apertures may be provided. Preferably the flanges 6 and 7 are thickened in the proximity of the apertures 11 as by providing radially extending ribs 17. The longitudinal axes of apertures 11 of each shaft yoke are parallel with the longitudinal axis of the hub of such shaft yoke. When the shaft yokes 4 and 5 are assembled to form the coupling, they are arranged angularly so that the apertures 11 of one yoke are staggered with respect to the apertures 11 of the other yoke.

A plurality of bolts 12 are carried by flanges 6 and 7. Bolts 12 extend through apertures 11 and through the central apertures 13 of pin blocks 14. The radial flange of each shaft yoke is provided with apertures or slots 10 to accommodate the heads of the bolts 12 carried by the opposing shaft yoke, to thereby allow relative motion of the shaft yokes. Retaining washers 15 are mounted upon the bolts 12 adjacent the outer ends of the pin blocks 14 while the inner ends of these pin blocks abut the radial flanges 6 and 7. Nuts and spring lock washers 16 carried by bolts 12 bear against the ribs 17 and cause bolts 12 to rigidly hold the pin blocks and retaining washers in fixed assembled relation with respect to the shaft yokes 4 and 5. The outer peripheral surface of each pin block 14 is made up of portions of varying curvature and comprises similar opposite cylindrical working or power transmitting faces or surfaces 18 of relatively large radii and connecting cylindrical surfaces 19. The centers of curvatures of the power transmitting faces 18 lie in a common plane extending through the central longitudinal axis of the pin block, whereas this longitudinal axis of the pin block is the common center of curvature of the connecting surfaces 19.

A plurality of bushings 21 of resilient cushioning material, preferably rubber, have central longitudinal apertures 22 which conform to the peripheral surface contour of pin blocks 14. Bushings 21 have a snug fit on pin blocks 14 so that when the pin blocks are pressed into these bushings, they are frictionally retained therein and against relative motion with respect to the walls of apertures 22. Bushings 21 are shorter than pin blocks 14 by a predetermined amount, so that both ends of the pin blocks project beyond their respective bushings, as especially shown in Fig. 3. This construction provides a suitable space beyond the ends of the bushings into which they may expand or flow when the coupling is under stress, thereby permitting desired relative motion between the shaft yokes.

Bushings 21 have cylindrical outer peripheral contours which are adapted to fit snugly into cylindrical apertures or eyes 23 provided in the end portions of coupling links 24. The eyes 23 are of the same length as the bushings 21. The radius of the walls of apertures or eyes 23 is made the same as the radius of the power transmitting faces 18 so that uniform thicknesses of rubber or other cushioning material extend between the faces 18 and the opposing walls of eyes 23 as measured substantially in the direction of the line of torque stress or substantially in the direction of the length of the coupling links 24. This is important and is a feature of the novel coupling of this invention. By thus providing an uniform thickness of cushioning material between each working face 18 of a pin block and the opposed wall of aperture 23, substantially uniform torque stresses and uniform deflections of all portions of the bushing in this region takes place in use. Also, owing to the relatively large area of each of the working faces 18, as compared, for example, with that of the shank of bolt 12, the stresses obtaining in the bushing material are merely nominal even when enormous torques are being transmitted by the coupling, which torques would quickly break down and destroy a bushing directly surrounding a pin or bolt such as 12. The end portions of the coupling links are illustrated as offset somewhat from each other (see Fig. 3) so as to facilitate the assembly of the coupling parts.

In operation, power and motion transmitted by the flexible coupling will result in compressing or deforming the bushings 21. Also, any irregularities of motion due to variations in annular velocity, or to variations of loads transmitted, or caused by deviations from true alignment of the shafts, or to end play or other causes, are compensated for by suitable deflections of the bushings 21. Owing to the snug fit between pin blocks 14 and bushings 21, and between bushings 21 and eyes 23, and to the varying cylindrical surface contour of pin blocks 14, there is no relative motion between the bushing surfaces and the adjoining surfaces of the pin blocks and link eyes. Thus, all motion of the rubber bushings is confined to a relative motion of internal particles, without surface slip or frictional wear, thereby utilizing the favorable characteristics of rubber as a medium to permit power transmission between shafts that may be out of alignment, the said result being accomplished without wear or appreciable deterioration of the rubber and without the need for lubrication, thereby assuring a prolonged life of the rubber and adequate flexibility.

The spacing of the ends of the bushings 21 from the retaining washers 15 and flanges 6 and 7 permits the flow of rubber outwardly of the eyes 23 and against these retaining surfaces when the coupling is under load, thereby giving the coupling flexibility while these retaining surfaces nevertheless limit the flow of rubber so that the bushings are not ruptured. When the coupling is subjected to great or sudden loads there is a tendency to deform the bushings 21 excessively. Such excessive deflection of the rubber bushings which might result in injury thereto is prevented by the ends of these bushings engaging the retaining washers 15 and radial flanges 6 and 7.

It will be noted that the novel coupling of this invention provides for substantially uniform torque or power stresses and consequent strains in uniform thicknesses of bushing material, together with means to prevent surface movement of the bushings with respect to the pin blocks and link eyes and additional means for limiting the end flow of the bushings, preventing rupture thereof.

Owing to the use of cylindrical working or power transmitting faces together with cylindrical connecting faces, the machining operation of making the pin blocks is rendered relatively simple, while at the same time sharp corners that would tend to cut or abrade the rubber bushings are eliminated. It will be noted that the coupling is of extremely simple construction and consists largely of duplicate parts, thereby greatly reducing manufacturing costs.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It will be apparent that each bolt 12 may be formed integral with its surrounding pin block 14 if desired as by cold rolling, in which event the retaining washer 15 will be secured as by a screw to the pin block.

What is claimed is:

1. In a flexible coupling for transmitting power between shafts, the combination of opposed shaft yokes, power transmitting means having a peripheral surface contour of varying curvature secured to said shaft yokes, bushings of cushioning material snugly surrounding said power transmitting means for fixed surface engagement therewith, and coupling links extending between said shaft yokes and having eyes snugly surrounding said bushings for fixed surface engagement therewith, the curvature of said link eyes being uniform and equal to the curvature of the major portion of the surface of said power transmitting means, whereby all relative movement of said shaft yokes is provided for by the flexing of said bushings.

2. In a flexible coupling for transmitting power between shafts, the combination of opposed shaft yokes, power transmitting means having a peripheral surface contour of varying curvature secured to said shaft yokes, bushings of cushioning material snugly surrounding said power transmitting means for fixed surface engagement therewith, and coupling links extending between said shaft yokes and having eyes snugly surrounding said bushings for fixed surface engagement therewith, whereby all relative movement of said shaft yokes is provided for by the flexing of said bushings, and means normally slightly spaced from the ends of said bushings for limiting the flexure of said bushings in use to protect the same from injury.

3. In a flexible coupling for transmitting power between shafts, the combination of opposed shaft yokes, power transmitting means having a peripheral surface contour of varying curvature secured to said shaft yokes, bushings of cushioning material snugly surrounding said power transmitting means for fixed surface engagement therewith, said bushings having substantially uniform thicknesses in the direction of the force exerted by said power transmitting means, and coupling links extending between said shaft yokes and having eyes snugly surrounding said bushings for fixed surface engagement therewith, whereby all relative motion of said shaft yokes is provided for by the flexing of said bushings, and means for limiting the flexure of said bushings in use to protect the same from injury.

4. In a flexible coupling for transmitting power between shafts, the combination of opposed shaft yokes, power transmitting means having peripheral surfaces provided with relatively large curved power transmitting faces joined by small connecting surfaces of lesser curvature, said power transmitting means being secured to said shaft yokes, bushings of cushioning material surrounding said power transmitting means for fixed surface engagement therewith, said bushings having uniform thicknesses overlying said power transmitting faces, and coupling links extending between said shaft yokes and having eyes snugly surrounding said bushings for fixed surface engagement therewith, whereby all relative motion of said shaft yokes is provided for by the flexing of said bushings.

5. In a flexible coupling for transmitting power between shafts, the combination of opposed shaft yokes, pin blocks secured to said shaft yokes, said pin blocks having peripheral surface contours of varying curvature, bushings of cushioning material having apertures conforming to the peripheral surface contours of said pin blocks and adapted to snugly receive said pin blocks, whereby the contacting surfaces of said bushings and said pin blocks are relatively immovable, and coupling links having eyes at the end portions thereof for snugly receiving said bushings, whereby the contacting surfaces of said bushings and said eyes are relatively immovable, said coupling links serving to interconnect said shaft yokes through said bushings and said pin blocks.

6. In a flexible coupling for transmitting power between shafts, the combination of opposed shaft yokes, pin blocks secured to said shaft yokes and disposed circumferentially intermediate said shaft yokes, consecutive pin blocks being secured to opposite shaft yokes, said pin blocks having cylindrical power transmitting faces of relative large proportions and connecting surfaces of lesser proportions, cylindrical bushings of cushioning material having apertures conforming to said pin blocks, said bushings being mounted snugly upon said pin blocks, and coupling links having cylindrical eyes in the end portions thereof for snugly receiving consecutive bushings to thereby interconnect said shaft yokes.

7. In a flexible coupling for transmitting power between shafts, the combination of opposed shaft yokes, pin blocks secured to said shaft yokes and disposed circumferentially intermediate said shaft yokes, consecutive pin blocks being secured to opposite shaft yokes, said pin blocks having cylindrical power transmitting faces, cylindrical bushings of cushioning material having apertures conforming to said pin blocks, said bushings being mounted snugly upon said pin blocks, and coupling links having cylindrical eyes in the end portions thereof for snugly receiving consecutive bushings to thereby interconnect said shaft yokes, the curvature of said coupling link eyes being the same as the curvature of said power transmitting faces, whereby substantially uniform thicknesses of bushing material are obtained in the direction of power transmission.

8. In a flexible coupling for transmitting power between shafts, the combination of opposed shaft yokes, pin blocks secured to said shaft yokes and disposed circumferentially intermediate said shaft yokes, consecutive pin blocks being secured to opposite shaft yokes, said pin blocks having cylindrical power transmitting faces and connecting faces, cylindrical bushings of cushioning material having apertures conforming to said pin blocks, said bushings being mounted snugly upon said pin blocks and terminating short of the ends of said pin blocks, means for limiting endwise flexure of said bushings to provide against the rupture thereof, and coupling links having cylindrical eyes in the end portions thereof for snugly receiving consecutive bushings to thereby interconnect said shaft yokes, the curvature of said coupling link eyes being the same as the curvature of said power transmitting faces, whereby substantially uniform thicknesses of bushing material are obtained in the direction of power transmission.

9. In a flexible coupling for transmitting power between shafts, the combination of opposed shaft yokes, pin blocks secured to said shaft yokes, said pin blocks having peripheral surfaces formed so as to provide opposite cylindrical working faces and end faces connecting said working faces, the area of said working faces being relatively large as compared with the area of said end races, bushings of cushioning material having apertures conforming to the peripheral surfaces of said pin blocks and adapted to snugly receive said pin blocks, whereby the contacting surfaces of said bushings and said pin blocks are relatively immovable, and coupling links having eyes therein for snugly receiving said bushings and serving to interconnect the bushings of said yokes, the curvature of the eyes of said coupling links being the same as that of said working faces, whereby substantially uniform thickness of bushing material is provided between the working faces of the pin blocks and the eyes of said coupling links.

In testimony, that I claim the invention set forth above I have hereunto set my hand this 22nd day of April 1930.

HOWARD D. AINSWORTH.